United States Patent [19]
Lange et al.

[11] Patent Number: 5,242,148
[45] Date of Patent: Sep. 7, 1993

[54] UPPER VALVE PART

[75] Inventors: Peter Lange; Helmut Ziebach, both of Lüdenscheid, Fed. Rep. of Germany

[73] Assignee: Flühs Drehtechnik GmbH, Lüdenscheid, Fed. Rep. of Germany

[21] Appl. No.: 844,674
[22] PCT Filed: Jun. 5, 1991
[86] PCT No.: PCT/DE91/00472
§ 371 Date: Apr. 9, 1992
§ 102(e) Date: Apr. 9, 1992
[87] PCT Pub. No.: WO92/03673
PCT Pub. Date: Mar. 5, 1992

[30] Foreign Application Priority Data
Aug. 14, 1990 [DE] Fed. Rep. of Germany ....... 4025654

[51] Int. Cl.5 ............................................. F16K 31/44
[52] U.S. Cl. ........................................ 251/82; 251/357
[58] Field of Search .................................... 251/82, 357

[56] References Cited
U.S. PATENT DOCUMENTS 1,910,994  5/1933  Joyce ........................... 251/82
3,420,493  1/1969  Kraft ............................ 251/82
3,454,032  7/1969  Hinz et al. ..................... 251/82

FOREIGN PATENT DOCUMENTS

0088334  9/1983  European Pat. Off.
2537206  3/1977  Fed. Rep. of Germany.
3207895  9/1983  Fed. Rep. of Germany.
8524528  11/1985  Fed. Rep. of Germany.
8805693  8/1988  Fed. Rep. of Germany.
1279365  11/1961  France.

Primary Examiner—A. Michael Chambers
Attorney, Agent, or Firm—Spencer, Frank & Schneider

[57] ABSTRACT

An axially movable valve piston (3) and a rotatable spindle (2), which are connected with one another via a thread (24; 32), are guided in a headpiece (1). A sealing ring (5), which projects beyond the end face of the headpiece (1) facing the suppy duct, is held by the headpiece (1). The sealing ring (5) is designed on the projecting outer end face as a surface (54) for resting against a valve seat (62) and on the opposite inner end face as a lip seal (52) cooperating with the valve piston (3). In its section cooperating with the lip seal (52), the valve piston (3) is designed in a flat and seal-free manner.

17 Claims, 6 Drawing Sheets

UPPER VALVE PART

TECHNICAL FIELD

The invention relates to an upper valve part for fixtures, in which an axially movable valve piston and a rotatable spindle are guided in a headpiece and are connected with one another via a thread.

Upper valve parts are used, for example, for controlling the water outflow from sanitary fixtures. To this end, the upper valve part is screwed with its headpiece into the housing of the sanitary fixture; a control knob or handle is fitted onto its spindle.

STATE OF THE ART

Two basic groups of upper valve parts can be distinguished depending on the manner in which the water flow is controlled in the region of a valve seat provided coaxial to the valve piston in the housing of the sanitary fixture. In one group (cf., for example, DE 85 24 528 U1), once the upper valve part has been screwed into place, a valve disc provided on the end face of the valve piston rests upon the valve seat with a sealing disc, which is secured to said valve disc. A rotation of the control knob results in a rotation of the spindle, which is converted via the thread into an axial movement of the valve piston, so that the valve seat is released by the valve disc with the sealing disc in proportion to the rotation of the control knob. A rotation of the control knob in the opposite direction results in the closure of the valve. In the other group (cf., for example, DE 32 07 895 C2), a sealing ring is immovably clamped between the headpiece and the valve seat. In the region of the end face of the headpiece facing the water supply a fixed disc made of ceramic material is held, which is provided with through openings. Instead of the valve piston, a carrier is provided which is rotatable together with the spindle. A control disc of ceramic material, which is also provided with through openings and rests against the side of the fixed disc facing away from the water supply, is held by the carrier. A rotation of the control knob results in a rotational movement of the spindle and the carrier, so that the control disc opens or closes the through openings of the fixed disc in proportion to the rotation of the control knob.

REPRESENTATION OF THE INVENTION

The invention aims to provide a further group of upper valve parts. It is the object of the invention to minimize wear and disturbances in the case of an upper valve part, which are essentially caused in the first group by the sealing disc coming to rest upon and lifting off the valve seat and in the second group by the sliding contact of the ceramic discs against one another. This object is attained according to the invention in that a sealing ring is held by the headpiece, which sealing ring projects beyond the end face of the headpiece facing the supply duct and is designed on the projecting outer end face as a surface for resting against a valve seat and on the opposite inner end face as a lip seal, which cooperates with the valve piston, which in its section cooperating with the lip seal is designed in a flat and seal-free manner.

According to the invention, the sealing ring rests with its outer end face against the valve seat. The term "valve seat" is also understood to mean the flat shoulder of a stepped bore formed in a housing. The position of the sealing ring is determined by the headpiece and is dependent upon whether the upper valve part is in the closed or open state. When the upper valve part is closed, the lip seal of the sealing ring rests against the valve piston. The term "lip seal" is understood to mean any seal which is inherently flexible and tilts from one end position into another according to the hydrostatic or pneumatic pressure acting upon it. The valve piston is flat in the section cooperating with the lip seal. It does not comprise a sealing ring in this section. A rotation of the control knob results in a rotation of the spindle, which is converted via the thread into an axial movement of the valve piston. When the upper valve part is opened, the valve piston moves away from the lip seal until the latter is released from the valve piston: The upper valve part is opened. The quantity of water allowed through is controlled by selecting the distance of the valve piston from the sealing ring. During closure, the valve piston moves in the direction of the lip seal until the latter is moved by the water, still flowing through, against the adjacent part of the valve piston. As soon as a sufficiently large surface of the lip seal rests against the valve piston, the lip seal is pressed fully against the valve piston in a sealing-tight manner by the resulting water pressure. This opening and closing action of the lip seal in relation to the valve piston occurs under the action of the water pressure as a function of the position of the valve piston. There is no mechanical compression of the sealing ring or mechanical friction, which minimizes the wear of the spindle, the thread between the spindle and valve piston, sliding discs and seals, for example of the sealing ring.

Refinements and further developments of the invention are contained in the subclaims.

BRIEF DESCRIPTION OF THE DRAWINGS

Two embodiments of the invention are described in further detail in the following and are illustrated in the drawings, in which.

BEST METHOD OF CARRYING OUT THE INVENTION

The upper valve part selected as an exemplified embodiment essentially comprises five parts which are connected with one another or guided against one another, namely a headpiece 1, a spindle 2 penetrating the headpiece 1 centrally and guided radially in said headpiece, a valve piston 3 screw-connected with the spindle 2 and guided axially in the headpiece 1, a headpiece attachment 4 screw-connected with the headpiece 1 and a sealing ring 5 held by the headpiece 1.

Figure 1:
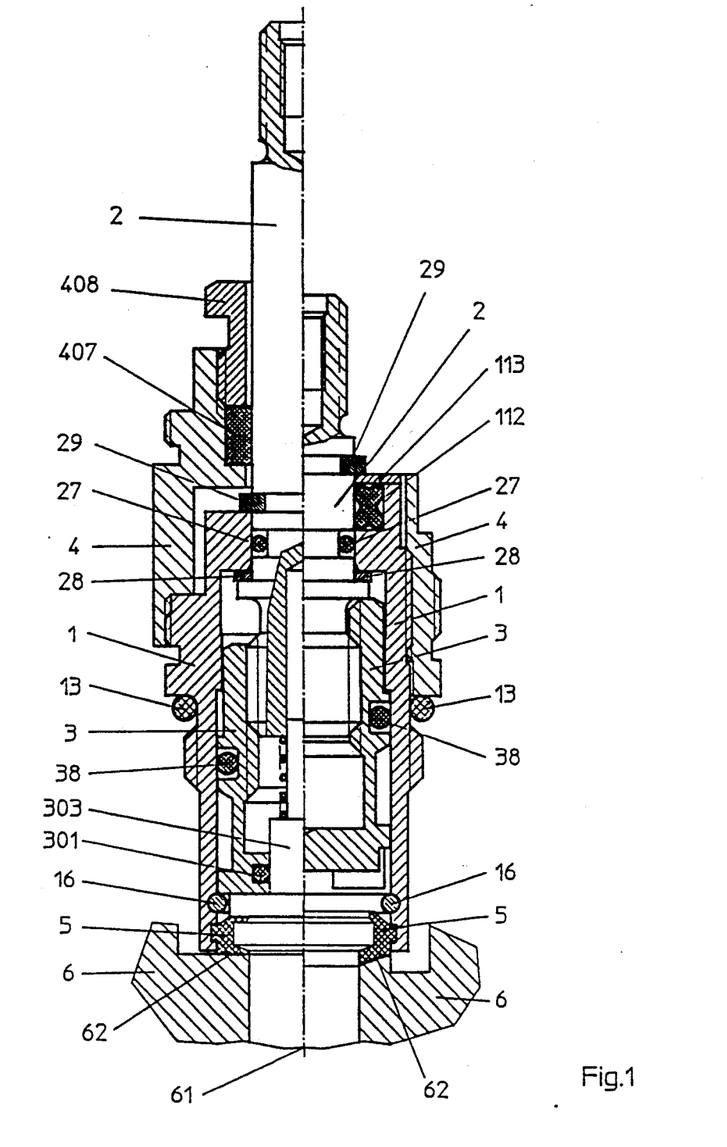
FIG. 1 is a longitudinal section through two upper valve parts connected with a sanitary fixture, one half of the section showing the first embodiment in the closed state and the second half of the section showing the second embodiment in the open state.
Figure 6:
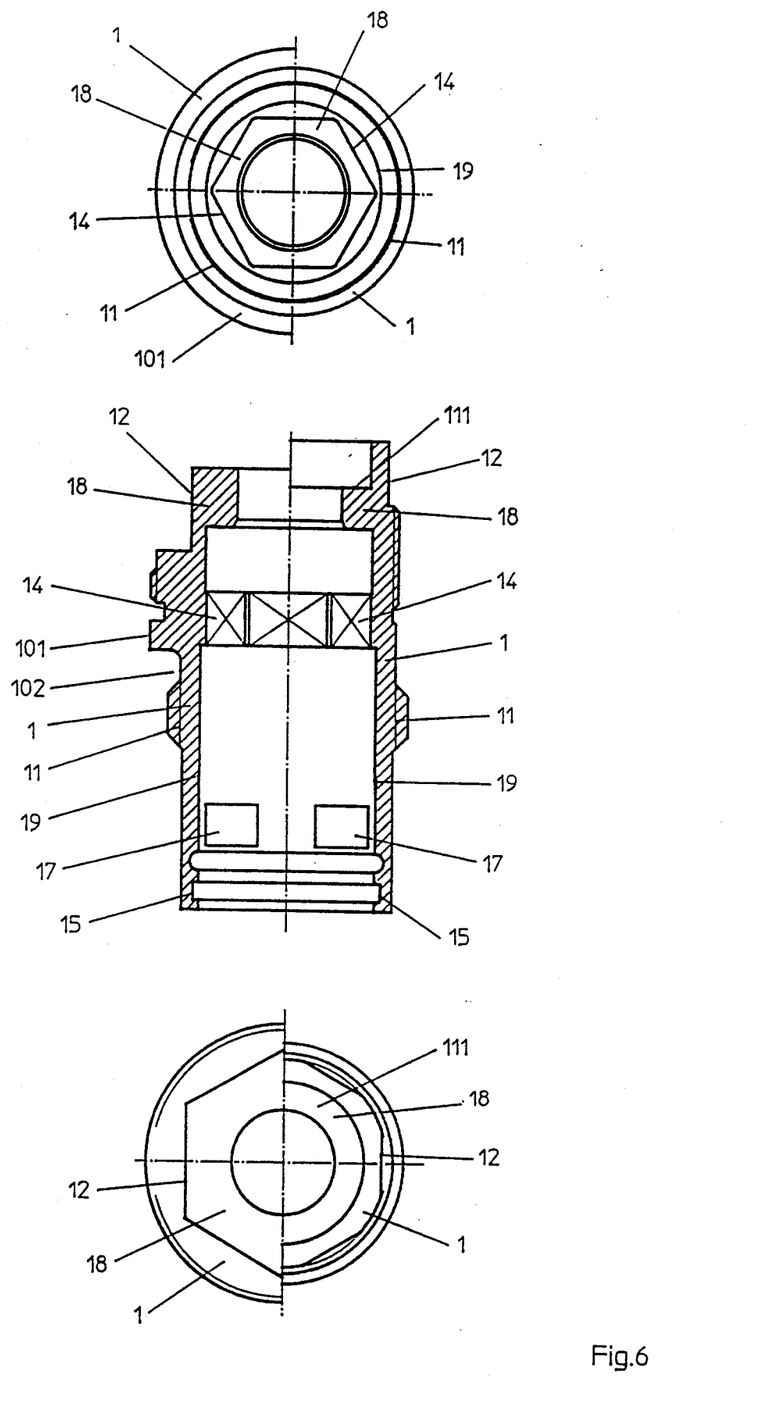
FIG. 6 is a longitudinal section through the headpieces of the upper valve parts.

The headpiece 1 comprises a symmetrical hollow body, whose two end faces are open—cf. FIGS. 1 and 6. Approximately in its centre, the headpiece 1 comprises an external thread 11, by means of which the headpiece can be screwed into the housing of a sanitary fixture 6, of which only part of a water supply duct is illustrated. Once the upper valve part has been screwed into place, a sealing ring 13 is arranged between the headpiece 1 and the sanitary fixture. The screwing of the headpiece 1 into the sanitary fixture is effected by means of key faces 12, which are provided on the surface of the headpiece 1 in the region of the outer end face. In the region of this end face, the headpiece 1 is provided with a recessed edge 18, against which the spindle 2 is axially supported and radially guided. Adjoining the edge 18 is an inner profile 14, which is provided to prevent torsion and for the axial guidance of the valve piston 3. On the water supply side, the inner profile 14 adjoins a cylindrical surface 19, which is also used for guiding the valve piston 3. At a distance from the opposite end face, i.e. the end face facing the water supply, the headpiece 1 is provided with an internal annular groove 15 which receives the sealing ring 5. In the headpiece 1 at a distance from the sealing ring 5, an abutment in the form of a snap ring 16 lodged in the inner wall is provided for limiting the axial movement of the valve piston 3 in the direction of the water supply. As a result of the fact that the valve piston 3 firstly moves against the elastic lip seal 52 and then against the fixed abutment in the form of the snap ring 16, a deformation of the sealing ring 5 is prevented. On the side of the snap ring 16 facing away from the internal annular groove 15, windows 17 are provided in the headpiece 1 for the water flow and are symmetrically distributed in the wall of the headpiece in the same transverse plane. In the exemplified embodiment, the windows 17 have a rectangular shape. They can increase or decrease in width starting from the edge facing the water supply—for example forming an isosceles triangle standing on its apex or base—so that a increasing or diminishing control of the rate of flow is obtained.

In the case of the embodiment shown on the left of the drawings, once the headpiece is screwed into place, an approximately centrally arranged outer flange 101 of the headpiece 1 rests upon the housing of the sanitary fixture. On its side facing the external thread 11, the outer flange 101 comprises an annular groove 102 for receiving the sealing ring 13. In the case of the embodiment shown on the right of the drawings, the sealing ring 13 is held by the headpiece attachment 4. In this embodiment, the edge 18 of the headpiece 1 comprises an inner shoulder 111, which receives a radially prestressed slide bearing 112 resting on the inside against the spindle 2. The slide bearing 112 is covered on its end face by a load disc 113. The slide bearing 112 prevents clearance of the spindle 2 in the radial direction.

Figure 2:
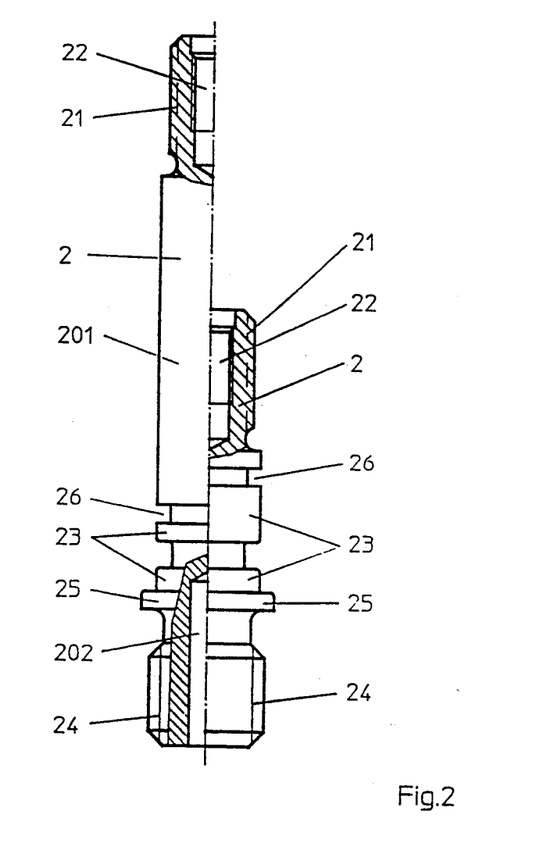
FIG. 2 is a side view, partially shown as a longitudinal section, of the spindles of both upper valve parts.

The spindle 2 is substantially solid in design and comprises a plug-like head-cf. FIGS. 1 and 2. At one end face, the spindle is designed as a polygon on the outside and is provided on the inside with a blind hole 22 having an internal thread for securing a control knob or lever, not shown. At a distance from the plug-like head, the spindle 2 is provided on the outside with an annular surface 23, by means of which the spindle 2 is radially guided against the edge 18. The annular surface 23 is interrupted by an annular groove, which receives a sealing ring 27. On the side opposite the polygon 21, the spindle 2 is provided on the outside with an external thread representing one part of a working thread. Adjoining the annular surface 23, a flange 25 is provided on the side facing the external thread 24, which flange rests on the inside with the interposition of a slide disc 28 against the edge 18 and absorbs the axial pressure generated during the operation of the spindle 2. On the side facing the polygon 21 a recess 26 is provided, which receives a safety ring 29, which rests on the outside against the edge 18 or the load disc 113. The substantially solid cylinder-shaped region between the flange 25 and the external thread 24 is dimensioned in such a manner that the spindle 2 can reliably withstand all occurring stresses.

In the case of the embodiment shown on the left in the drawings, the spindle 2 is lengthened by an intermediate cylinder 201, for example for concealed assembly, in the section between the polygon 21 and annular flange 23. A blind bore 202 is formed axially on the side opposite the polygon 21.

Figure 3:
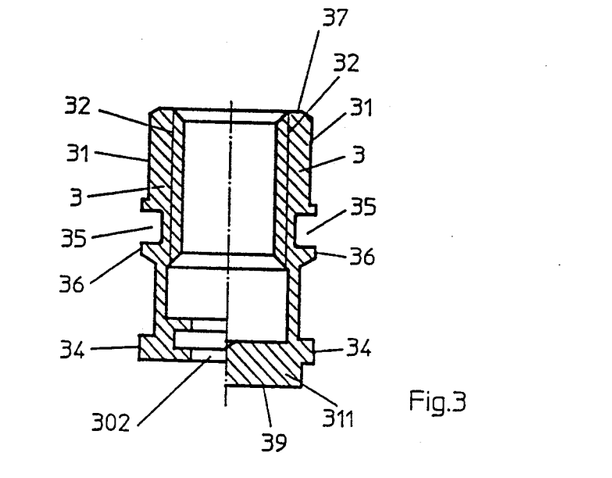
FIG. 3 is a longitudinal section through the valve pistons of both upper valve parts.
Figure 4:
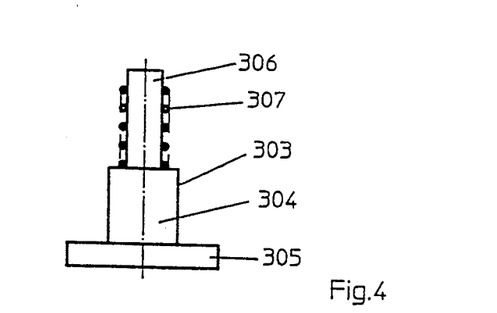
FIG. 4 is a side view of the reflux prevention means belonging to one of the valve pistons.

As shown in FIGS. 1, 3 and 4, at one end face the valve piston 3 comprises an outer profile 31, by means of which the valve piston 3 is guided axially within the inner profile 14 of the headpiece 1, and an internal thread 32, which represents the other part of the working thread and into which the external thread 24 of the spindle 2 is screwed. A rotation of the spindle 2 by means of the control knob, not shown, is converted via the working thread 24, 32 as well as the outer profile 31 and the inner profile 14 into an axial movement of the valve piston 3. With this axial movement, the end face of the valve piston 3 facing the water supply duct is raised or lowered relative to a valve seat 62 provided in a water supply duct 61 of the sanitary fixture 6. During this axial movement, the valve piston 3 is also guided in the headpiece 1 by means of an outer flange 34 formed onto the piston in the region of its water supply side and an outer flange 36 formed onto the piston adjoining the outer polygon 31 on the one hand and by means of the cylindrical surface 19 on the other hand. An annular groove 35 for receiving a sealing ring 38 is provided in the outer flange 36. The sealing ring 38 fully seals the upper valve part relative to the outside, the working thread 24, 32 lying within the sealed region. Grease necessary for the operation of the working thread 24, 32 remains untouched by water.

The axial movement of the valve piston 3 in the direction of the valve seat 62 is limited by the abutment of the outer flange 34 against the snap ring 16 and in the opposite direction by the abutment of the end face 37 against the flange 25 of the spindle 2. Since the valve piston 3 is moved between two fixed abutments, the angle of rotation can be fixed, for example at 90°, 180°, etc., via the pitch of the working thread and the stroke. This is important in the case of asymmetrical handles mounted in certain positions.

In the case of the embodiment shown on the left in the drawings, the end face of the valve piston 3 facing the water supply duct comprises a bore 302 sealed by a sealing ring 301. The bore 302 receives a reflux prevention means 303. The reflux prevention means 303 is formed by a shaft 304, which is held in the bore 302 and onto which are formed on the outside a disc 305 resting against the end face of the valve piston 3 and on the inside a plunger 306 guided in the blind bore 202 of the spindle 2. Arranged between the opposing end faces of the shaft 304 and the spindle 2 is a helical spring 307 enclosing the plunger 306. When the water supply 61 duct is free of pressure, the reflux prevention means 303 prevents the reflux of water into lower lying areas connected to the same mains water supply when the valve piston 3 is open. In the embodiment shown on the right in the drawings, the end face per se is designed in the manner of a continuous disc 311. On the side facing the valve seat 62, both discs 305, 311 are flat and without a sealing ring. Towards the edge or centre, the discs can be provided with a circumferential bevel. The bevel is provided for reasons relating to flow technology: The noise generation during opening and closing of the valve is minimized.

Figure 5:
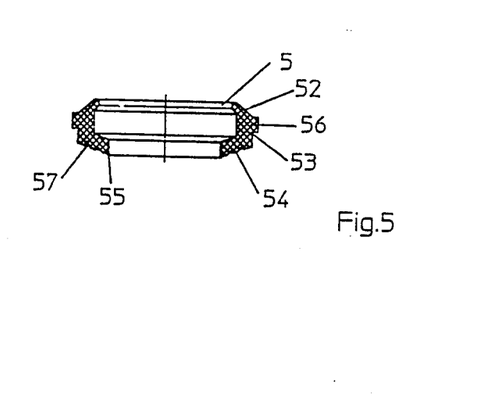
FIG. 5 is a longitudinal section through the sealing ring of the upper valve parts.

As shown in FIGS. 1 and 5, the sealing ring 5 is held by the headpiece 1. The sealing ring 5 comprises a central section 53. A collar 56 is formed onto the outer surface of the central section 53 and engages in the internal annular groove 15 in the headpiece 1. An extension 55 designed in the manner of a spring disc is formed onto the central section 53 on the end face facing the water supply duct. With the extension 55 the sealing ring 5 projects beyond the end face of the headpiece 1 facing the water supply duct. On the projecting outer end face, the extension 55 is designed as a surface 54 for resting against the valve seat 62. The shoulder 55 is provided on its bearing surface 54 with annular grooves 57. On the opposite inner end face, the sealing ring 5 is designed as a lip seal 52 cooperating with the end face 39 or the disc 305. The lip seal 52 is also formed onto the central section 53. The central section 53, the lip seal 52 and the extension 55 each have a substantially trapezoidal cross section.

In the embodiment shown on the left of the drawings, the valve seat 62 comprises a flat shoulder, which radially adjoins the end of the water supply duct 61. In the embodiment shown on the right of the drawings, an inclined valve seat 62 conventionally used with fixtures is provided at the end of the water supply duct.

Figure 7:
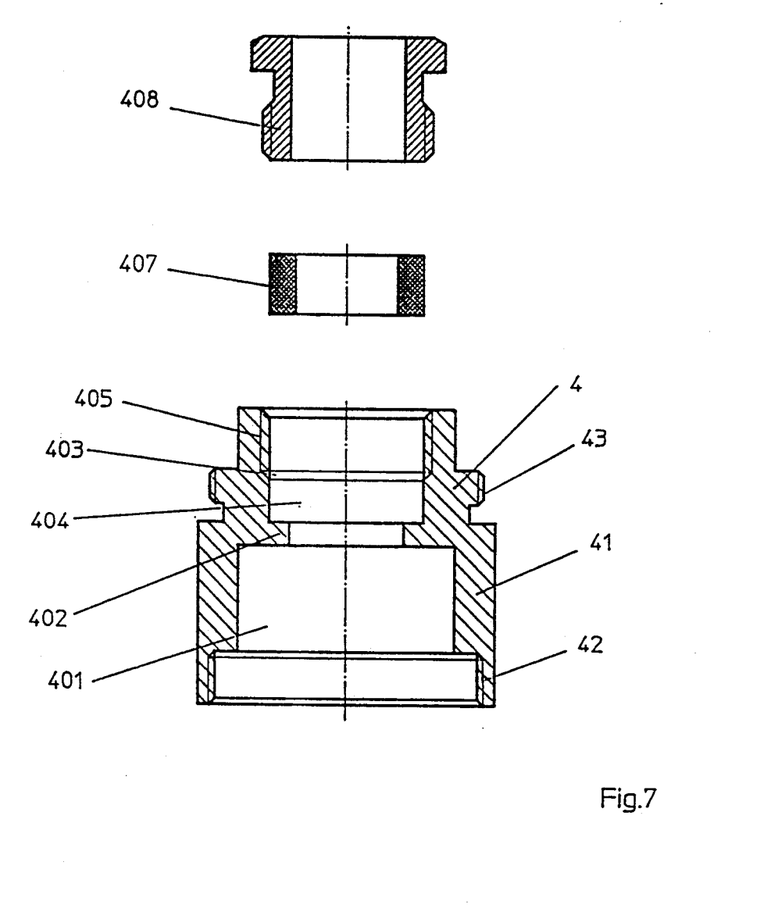
FIG. 7 is a longitudinal section through the three-part headpiece attachment belonging to one of the upper valve parts.
Figure 8:
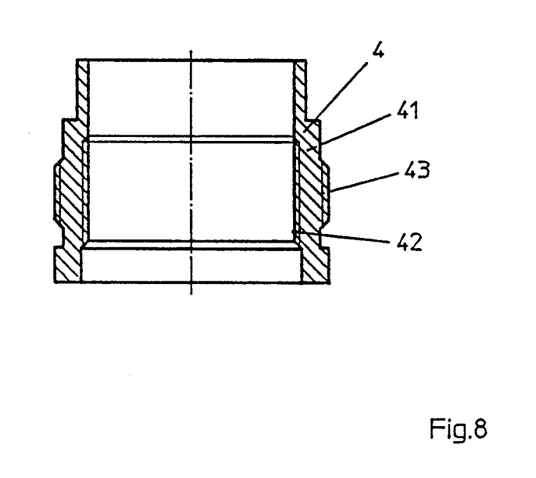
FIG. 8 is a longitudinal section through the one-part headpiece attachment belonging to the other upper valve part.

The headpiece attachment 4 comprises a substantially hollow cylindrical body 41, which comprises an internal thread 42 for its screw-connection with the headpiece 1 and an external thread 43 for securing a covering cap—cf. FIGS. 1, 7 and 8.

In the embodiment shown on the left in the drawings, the headpiece attachment 4 is part of an adjustable spindle brake: A receiving element 401 adjoining the internal thread 42 for receiving the upper part of the headpiece 1 is separated by a collar 402 from a bore 403, which in its base region 404 is designed without a thread and in its upper region 405 with a thread 406. The base region 404 receives a packing 407 and a plug 408 enclosing the spindle 2 is screwed into the thread 406. The contact pressure, which the packing 407 exerts upon the spindle 2, can be adjusted by tightening the plug 408. In this manner, the actuating moment for the upper valve part can be adjusted, which is of particular importance in the case of asymmetrical heavy lever-type handles on horizontally fitted, e.g. concealed upper valve parts in order to prevent an automatic opening or closure of the valve. In the embodiment shown on the right in the drawings, the headpiece attachment 4 is part of the two-part headpiece. This design allows for fitting with different depths of valve seat 62 and is particularly expedient in cases of supplementary fittings and renovation projects.

The elements associated with the embodiment shown on the left of the drawings can also be associated with the embodiment shown on the right, and vice versa.

COMMERCIAL APPLICATION

The upper valve part according to the invention can not only be used in the case of sanitary fixtures, but also in the case of other fixtures for controlling the rate of flow of various media, i.e., in addition to water, gas or oil for example.

We claim:

1. An upper valve part for fixtures, in which an axially movable valve piston (3) and a rotatable spindle (2) are guided in a headpiece (1) and are connected with one another via a thread (24; 32), characterised in that a sealing ring (5) is held by the headpiece (1), which sealing ring projects beyond the end face of the headpiece (1) facing the supply duct and is designed on the projecting outer end face as a surface (54) for resting against a valve seat (62) and on the opposite inner side as a lip seal (52), which cooperates with the valve piston (3), which in its section cooperating with the lip seal is designed in a flat and seal-free manner.

2. An upper valve part according to claim 1, characterised in that the sealing ring (5) comprises a central section (53), which is held by the headpiece (1) and onto which is formed on the one hand the lip seal (52) and on the other hand an extension (55) designed in the manner of a spring disc and comprising the bearing surface (54) for the valve seat (62).

3. An upper valve part according to claim 2, characterized in that the central section (53), the lip seal (52) and the extension (55) have trapezoidal cross sections.

4. An upper valve part according to claim 2, characterised in that a collar (56) which engages in a groove in the headpiece (1) is formed onto the outer surface of the central section (53).

5. An upper valve part according to one of claim 2, characterised in that the extension (55) is provided with annular grooves (57) on its bearing surface (54).

6. An upper valve part according to one of claim 1, characterised in that abutments are provided in the headpiece (1) for limiting the axial movement of the valve piston (3).

7. An upper valve part according to claim 6, characterised in that a snap ring (16) is inserted in the headpiece (1) approximately at the height of the lip seal (52), against which snap ring the valve piston (3) strikes in its lower end position.

8. An upper valve part according to claim 6, characterised in that a flange (25) is formed onto the spindle (2) at a distance from the thread (24, 32), against which flange the valve piston (3) strikes in its upper end position.

9. An upper valve part according to one of claim 1, characterised in that the valve piston (3) is designed as a continuous disc (311) on the end face facing the sealing ring (5).

10. An upper valve part according to one of claim 1, characterised in that the valve piston (3) is provided with a reflux prevention means (303).

11. An upper valve part according to claim 10, characterised in that the reflux prevention means (303) is formed by a shaft (304), which is held in a bore (302) provided in the end face of the valve piston (3) facing the supply duct, a disc (305) which is formed onto the outside of the shaft (304) and rests against the end face of the valve piston (3), a plunger (306) which is formed onto the shaft (304) on the inside and is guided in a blind bore (202) in the spindle (2), and a helical spring (307), which is arranged between the opposing end faces of the shaft (304) and the spindle (2).

12. An upper valve part according to one of claim 1, characterised in that the headpiece (1) is provided in its wall at a distance from the sealing ring (5) with windows (17) for the passage of a medium flowing between the sealing ring (5) and the valve piston (3).

13. An upper valve part according to claim 12, characterised in that the windows (17) increase or decrease in width starting from the edge facing the sealing ring (5).

14. An upper valve part according to one of claim 1, characterised in that the headpiece (1) is designed in two parts.

15. An upper valve part according to claim 14, characterised in that a headpiece attachment (4) is screwed onto the headpiece (1).

16. An upper valve part according to claim 14, characterised in that a slide bearing (112) resting on the inside against the spindle (2) and covered by a load disc (113) on its end face is held by the headpiece (1) or the headpiece attachment (4).

17. An upper valve part according to claim 14, characterised in that an adjustable spindle brake resting on the inside against the spindle (2) is held by the headpiece (1) or the headpiece attachment (4).

* * * * *